(12) United States Patent
Wang et al.

(10) Patent No.: US 9,653,990 B1
(45) Date of Patent: May 16, 2017

(54) NEGATIVE CHARGE PUMP WITH SOFT START

(71) Applicant: STMicroelectronics (Shenzhen) R&D Co. Ltd, Shenzhen (CN)

(72) Inventors: Meng Wang, Shenzhen (CN); Xue Lian Zhou, Shenzhen (CN)

(73) Assignee: STMicroelectronics (Shenzhen) R&D Co. Ltd, Shenzhen (CN)

( * ) Notice: Subject to any disclaimer, the term of this patent is extended or adjusted under 35 U.S.C. 154(b) by 0 days.

(21) Appl. No.: 14/955,116

(22) Filed: Dec. 1, 2015

(30) Foreign Application Priority Data

Nov. 20, 2015 (CN) .......................... 2015 1 0818302

(51) Int. Cl.
*H02M 3/07* (2006.01)

(52) U.S. Cl.
CPC ........ *H02M 3/07* (2013.01); *H02M 2003/071* (2013.01)

(58) Field of Classification Search
None
See application file for complete search history.

(56) References Cited

U.S. PATENT DOCUMENTS

| | | | | |
|---|---|---|---|---|
| 5,168,174 A * | 12/1992 | Naso | ....................... | H02M 3/07 327/536 |
| 5,818,766 A * | 10/1998 | Song | ....................... | G11C 16/30 327/536 |
| 6,624,619 B2 * | 9/2003 | Fujita | ....................... | H02M 3/07 323/288 |
| 7,208,997 B2 * | 4/2007 | Sohara | ....................... | H02M 3/07 327/536 |
| 7,348,829 B2 * | 3/2008 | Choy | ....................... | H02M 3/07 327/536 |
| 7,554,385 B2 * | 6/2009 | Ishida | ....................... | H02M 3/07 327/170 |
| 7,847,621 B2 * | 12/2010 | Oyama | ....................... | H02M 3/07 327/536 |
| 7,986,109 B2 * | 7/2011 | Kishioka | ....................... | H02M 3/07 315/209 R |
| 8,120,411 B1 * | 2/2012 | Liu | ....................... | H02M 1/36 327/535 |
| 8,283,970 B2 * | 10/2012 | Lin | ....................... | H02M 3/07 327/536 |
| 8,310,300 B2 * | 11/2012 | Cook | ....................... | H02M 3/07 327/536 |
| 8,742,834 B2 * | 6/2014 | Motoki | ....................... | H02M 3/07 327/536 |
| 8,830,776 B1 * | 9/2014 | Choy | ....................... | G05F 1/46 365/218 |

(Continued)

*Primary Examiner* — Thomas J Hiltunen
(74) *Attorney, Agent, or Firm* — Gardere Wynne Sewell LLP

(57) ABSTRACT

A charge pump circuit is coupled between a positive supply node and a ground node. The charge pump circuit operates in response to clock signals output from a clock generator to produce a negative voltage at a negative voltage output node. A soft-start circuit for the charge pump circuit includes a comparison circuit configured to compare a varying intermediate voltage sensed between a rising supply voltage and the negative voltage to a ramp voltage during a start-up period of the charge pump circuit. The clock generator is selectively enabled to generate the clock signals in response to the comparison to provide for pulse-skipping.

20 Claims, 3 Drawing Sheets

(56) References Cited

U.S. PATENT DOCUMENTS

| | | | |
|---|---|---|---|
| 9,118,238 B2* | 8/2015 | Liu ......................... | H02M 3/07 |
| 9,172,300 B2* | 10/2015 | Li ........................... | H02M 3/07 |
| 2006/0028854 A1* | 2/2006 | Kawai .................. | H02M 3/073 |
| | | | 365/96 |
| 2007/0024347 A1* | 2/2007 | Nagasawa ............... | H02M 3/07 |
| | | | 327/536 |
| 2007/0176671 A1* | 8/2007 | Ishida .................... | H02M 3/07 |
| | | | 327/536 |
| 2007/0279021 A1* | 12/2007 | Yanagida ................ | H02M 3/07 |
| | | | 323/272 |
| 2008/0122522 A1* | 5/2008 | Nagasawa ............... | H02M 3/07 |
| | | | 327/536 |
| 2011/0018619 A1* | 1/2011 | Cassia .................... | H02M 3/07 |
| | | | 327/537 |
| 2016/0116925 A1* | 4/2016 | Freeman ........... | H02M 3/33546 |
| | | | 307/130 |
| 2016/0126830 A1* | 5/2016 | Fowers .................. | G05F 3/205 |
| | | | 327/536 |

* cited by examiner

NEGATIVE CHARGE PUMP WITH SOFT START

PRIORITY CLAIM

This application claims priority from Chinese Application for Patent No. 201510818302.4 filed Nov. 20, 2015, the disclosure of which is incorporated by reference.

TECHNICAL FIELD

The present invention relates to a DC-DC converter circuit and, in particular, to a negative charge pump converter circuit with a soft start operation.

BACKGROUND

Reference is made to FIG. 1 showing a circuit diagram of a conventional negative charge pump circuit 10. The circuit 10 includes a first CMOS switching circuit 12 and a second CMOS switching circuit 14. Each switching circuit 12 and 14 is formed by a series-connected pair of MOSFETs (drive transistors) including a p-channel transistor 16 and an n-channel transistor 18. The first CMOS switching circuit 12 is connected between a positive voltage supply node Vpos and a ground reference node Vgnd (with the source of transistor 16 connected to the positive voltage supply node Vpos and the source of transistor 18 connected to the ground reference node Vgnd). The second CMOS switching circuit 14 is connected between the ground reference node Vgnd and a negative voltage output node Vneg (with the source of transistor 16 connected to the ground reference node Vgnd and the source of transistor 18 connected to the negative voltage output node Vneg). The transistors 16 and 18 have their source-drain paths connected to each other at the drain terminals of the transistors 16, 18 to define a positive node 20 for the first CMOS switching circuit 12 and a negative node 22 for the second CMOS switching circuit 14. A fly capacitor Cfly is connected between the positive and negative nodes 20 and 22, respectively. An output capacitor Cout is connected between the negative voltage output node Vneg and the ground reference node Vgnd. The gate terminals of the drive transistors within the first and second CMOS switching circuits 12 and 14 are each driven by a driver circuit 24 in response to a clock signal (clk1-clk4) generated by a non-overlap clock generator circuit 26. FIG. 2 illustrates the general shape for the waveform of the clock signals clk1-clk4. During a first phase 40 of each cycle 42 of the waveform, the p-channel transistors 16 in the first and second CMOS switching circuits 12 and 14 are each turned on and current flows from the positive voltage supply node Vpos to the ground reference node Vgnd to charge the capacitor Cfly. During a second phase 44 of cycle 42, the n-channel transistors 18 in the first and second CMOS switching circuits 12 and 14 are each turned on connecting the more positive plate of the charged capacitor Cfly to ground and the more negative plate of the charged capacitor Cfly to the negative voltage output node Vneg. A negative voltage is eventually generated at the negative voltage output node Vneg having an absolute value equal to the voltage at the positive voltage supply node Vpos.

The control of the charge pump circuit 10 is preferably open loop for reasons of simplicity and cost reduction. Thus, soft start control over charge pump circuit operation is typically not used. The duty cycle of the clock signals clk1-clk4 is fixed. There is a need in the art, however, for soft start control of an open loop-type charge pump circuit.

SUMMARY

In an embodiment, a circuit comprises: a charge pump circuit coupled between a positive supply node and a ground node, said charge pump circuit operating in response to a plurality of clock signals output from a clock generator to produce a negative voltage at a negative voltage output node; and a soft-start circuit for said charge pump circuit comprising a comparison circuit configured to compare an intermediate voltage between a supply voltage and the negative voltage to a falling ramp voltage during a start-up of the charge pump circuit and selectively enable to clock generator to generate said plurality of clock signals in response to said comparison.

In an embodiment, a circuit comprises: a charge pump circuit coupled between a positive supply node and a ground node, said charge pump circuit including a clock generator configured to generate a plurality of clock signals, the charge pump circuit responding to said plurality of clock signal to produce a negative voltage at a negative voltage output node; and a soft-start circuit for said charge pump circuit operating to cause pulse skipping of the plurality of clock signals during soft-start, said pulse skipping occurring each time an intermediate voltage that is sensed by the soft-start circuit between a supply voltage and the negative voltage crosses over a ramp voltage.

In an embodiment, a circuit comprises a charge pump circuit having a negative voltage output node and a soft-start circuit for said charge pump circuit. The charge pump circuit includes: a first CMOS switching circuit coupled between a positive supply node and a ground node and configured to receive first and second clock signals and having a first output; a second CMOS switching circuit coupled between the ground node and the negative voltage output node and configured to receive third and fourth clock signals and having a second output; wherein the first and second outputs are configured for connecting to opposite plates of a fly capacitor; and a clock generator circuit configured to generate the first through fourth clock signals. The soft-start circuit comprises: a resistive voltage divider having at least a first tap node, the resistive voltage divider coupled between a supply voltage node and the negative voltage output node; a ramp signal generator configured to generate a ramp signal; and a first comparator configured to compare a voltage at the first tap node to a voltage of the ramp signal to generate a first enable signal applied to control enabling of the clock generator circuit to generate the first through fourth clock signals.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 3:
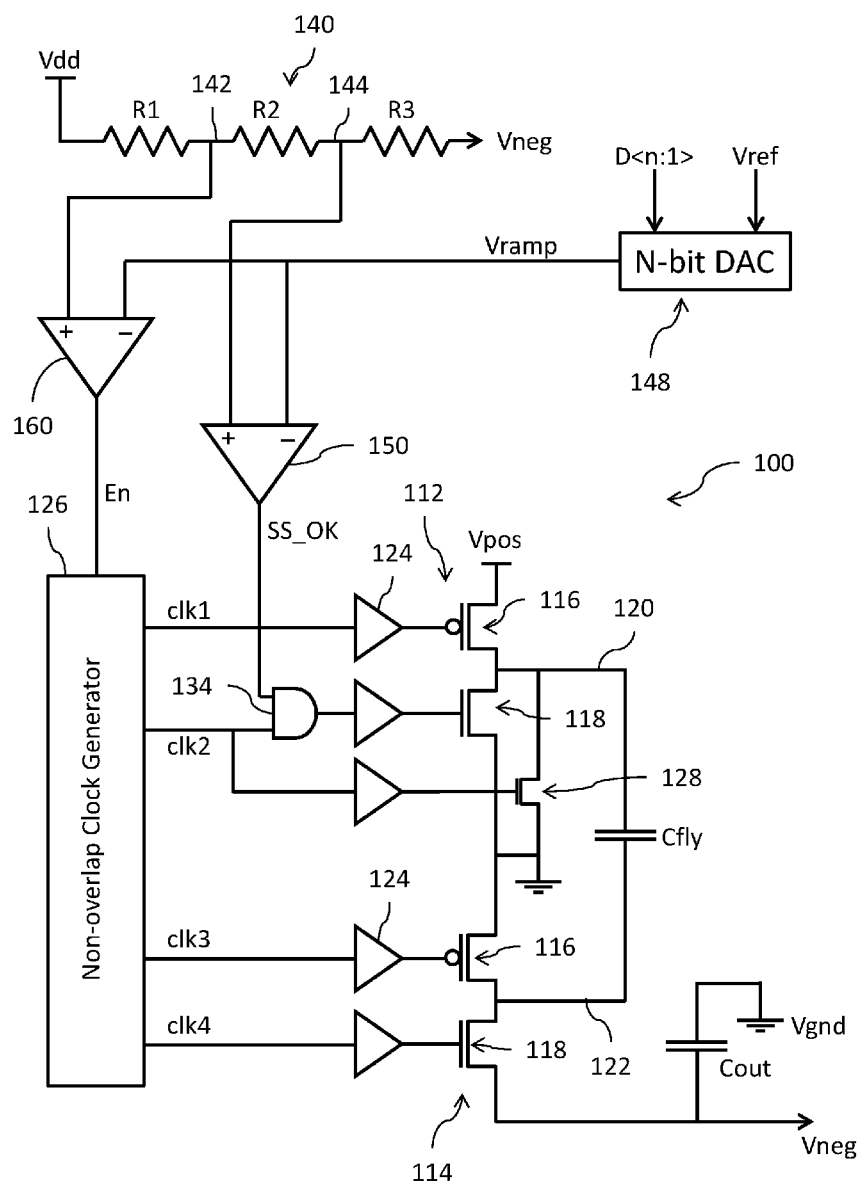
FIG. 3 is a circuit diagram for a negative charge pump circuit with soft-start operation.

Reference is now made to FIG. 3 showing a circuit diagram for a negative charge pump circuit 100 with soft start control. The circuit 100 includes a first CMOS switching circuit 112 and a second CMOS switching circuit 114. Each switching circuit 112 and 114 is formed by a series-connected pair of MOSFETs (drive transistors) including a p-channel transistor 116 and an n-channel transistor 118. The first CMOS switching circuit 112 is connected between a positive voltage supply node Vpos and a ground reference node Vgnd (with the source of transistor 116 connected to the positive voltage supply node Vpos and the source of transistor 118 connected to the ground reference node Vgnd). The second CMOS switching circuit 114 is connected between the ground reference node Vgnd and a negative voltage output node Vneg (with the source of transistor 116 connected to the ground reference node Vgnd and the source of transistor 118 connected to the negative voltage output node Vneg). The transistors 116 and 118 have their source-drain paths connected to each other at the drain terminals of the transistors 116, 118 to define a positive node 120 for the first CMOS switching circuit 112 and a negative node 122 for the second CMOS switching circuit 114. A fly capacitor Cfly is connected between the positive and negative nodes 120 and 122, respectively. An output capacitor Cout is connected between the negative voltage output node Vneg and the ground reference node Vgnd. The gate terminals of the transistors within the first and second CMOS switching circuits 112 and 114 are each driven by a driver circuit 124 in response to a clock signal (clk1-clk4) generated by a non-overlap clock generator circuit 126.

The first CMOS switching circuit 112 includes a further n-channel drive transistor 128 connected in parallel with the n-channel transistor 118 so as to have common source and drain terminals but separate gate terminals. The transistor 128 is smaller in size than the transistor 118 (i.e., its width and/or length dimensions are smaller; for example, the ratio of transistor 118 to transistor 128 may be 10:1 in one example case, the exact ratio being determined by the in-rush current limit of capacitor Cfly.). The gate terminal of transistor 128 is also driven by a driver circuit 124 in response to the same clock signal clk2 as the transistor 118. However, the clock signal clk2 is gated by a logic AND gate 134 before application to the gate terminal of transistor 118. A first input of the AND gate 134 receives the clock signal clk2 and a second input of the AND gate 134 receives a control signal SS_OK indicating that a soft-start period of the circuit 100 is completed. Thus, during soft-start the AND gate 134 blocks the clock signal clk2 from being applied to the gate terminal of transistor 118, but the smaller parallel-connected transistor 128 is driven by the clock signal clk2 to permit charge pump operation. When the soft-start period is completed, the control signal SS_OK is asserted, the AND gate 134 passes the clock signal clk2, and the gate terminal of transistor 118 is then also driven by the clock signal clk2. The control signal SS_OK accordingly comprises an enable signal which blocks the clock signal clk2 from being applied to the gate of the n-channel transistor 118 during the soft-start period, and enables the n-channel transistor 118 to receive the clock signal clk2 through the AND gate 134 when the soft-start period ends.

When the charge pump is enabled, the charging current of the capacitor Cfly is limited only by the on-resistance of transistor 116 and the charging current of the capacitor Cout is limited only by the on-resistance of transistor 118. The capacitor Cout will be charged very quickly because the on-resistance of transistors 116 and 118 is small, this results in a large in-rush current that could adversely affect reliability of the circuit. Soft-start is critical to proper operation of this circuit.

With the smaller transistor 128 enabled during soft-start (and the transistor 118 disabled), charge current for the capacitor Cout is now limited by the resistance of transistor 128 which can be set much higher (for example, 10:1) and in-rush current is reduced.

It will be noted that transistor 128 does not have to be associated with the first CMOS switching circuit 112. The transistor could instead be in the second CMOS switching circuit 114. Transistor 128 is chosen for use in circuit 112 because the driver circuit is more easily implemented (ground based), but this is not a requirement. Transistor 128 could be placed parallel with the lower side transistor 118 of circuit 114. It will further be noted that transistor 128 could instead be a p-channel device coupled in parallel with transistor 116 in either circuit 112 or circuit 114.

The circuit 100 further includes a resistive divider circuit 140 comprising a plurality of resistors R1-R3 connected in series between a voltage supply node (Vdd) and the negative voltage output node Vneg. In an example implementation, the voltage Vdd can be a low voltage analog supply voltage or a reference voltage. The resistive divider circuit 140 includes a first tap node 142 between resistors R1 and R2 and a second tap node 144 between resistors R2 and R3. The resistance values of the resistors R1-R3 are selected such that the voltage at the second tap node 144 is greater than the ground voltage at the ground reference node Vgnd for all possible values of voltage at Vdd and Vneg, and that the voltage at the first tap node 142 is slightly greater (for example, by only tens of mV) than the voltage at the second tap node 144.

The control signal SS_OK is generated by a first comparator circuit 150. The non-inverting input of the comparator circuit 150 is connected to the second tap node 144. The inverting input of the comparator circuit 150 is configured to receive a decreasing ramp voltage Vramp. The comparator circuit 150 functions to compare the decreasing ramp voltage to the voltage at the second tap node 144. It will be noted that the supply voltage Vdd is fixed as Vneg changes (i.e., falls) but is higher than the ground voltage at all times. For the duration of the soft-start period, the ramp voltage will exceed the voltage at the second tap node 144 and the comparator circuit 150 will not assert the control signal SS_OK. As a result, the clock signal clk2 is blocked by the AND gate 134 from being applied to the gate terminal of transistor 118. Soft-start of the circuit 100 instead utilizes the smaller transistor 128 in the first CMOS switching circuit 112. The soft-start period ends when the decreasing ramp voltage falls below (crosses over) the varying voltage at the second tap node 144. The output of the comparator circuit 150 changes state and the control signal SS_OK is asserted. The clock signal clk2 is then passed by the AND gate 134 and applied to the gate terminal of transistor 118.

Figure 1:
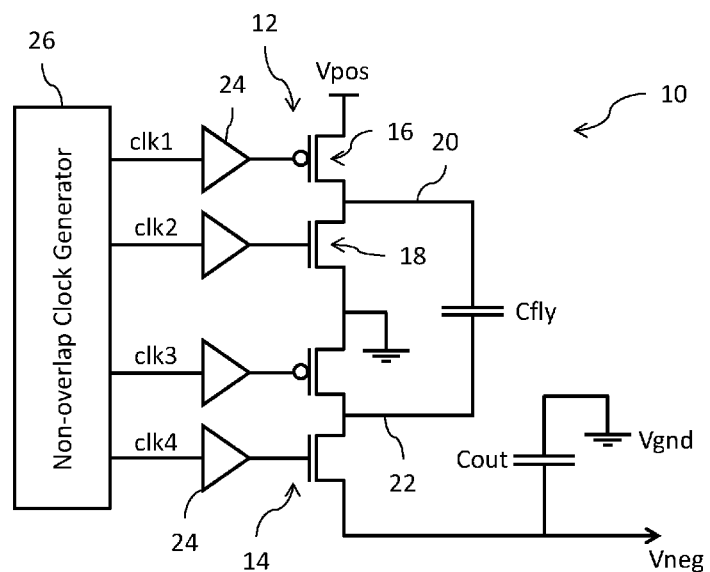
FIG. 1 is a circuit diagram for a conventional negative charge pump circuit.
Figure 2:
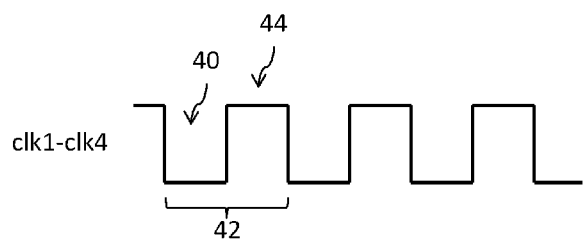
FIG. 2 illustrates the waveform for clock signals driving operation of the circuit of FIG. 1.
Figure 5:
FIG. 5 illustrates pulse-skipping.

Reference is made to FIG. 2 which illustrates the waveform for the clock signals clk1-clk4 generated by the non-overlap clock generator circuits 26 and 126. The clock signals clk1-clk4 are output from the non-overlap clock generator circuits 26 and 126 when an enable signal (En) is asserted. The enable signal En is generated by a second comparator circuit 160. The non-inverting input of the comparator circuit 160 is connected to the first tap node 142. The inverting input of the comparator circuit 160 is configured to receive the decreasing ramp voltage Vramp. The comparator circuit 160 functions to compare the decreasing ramp voltage to the voltage at the first tap node 142, it being understood that during the soft-start period the voltage at the first tap node 142 will vary with the supply voltage Vdd stable and as the negative output voltage at the negative voltage output node Vneg is pumped lower. When the varying voltage at the first tap node 142 rises above (crosses over) the decreasing ramp voltage, the comparator circuit 160 asserts the enable signal En which enables the clock output by the non-overlap clock generator circuit 126. As a result, the clock signals clk1-clk4 are applied to the first and second CMOS switching circuits 112 and 114. On the contrary, when the varying voltage at the first tap node 142 falls below (crosses over) the decreasing ramp voltage, the comparator circuit 160 deasserts the enable signal En which disables the clock output by the non-overlap clock generator circuit 126. In an embodiment, when the non-overlap clock generator circuit 126 is disabled, the clock signals clk1-clk4 each have a fixed logic state (for example, configured to turn off the transistors 116, 118 and 128). The disabling of the non-overlap clock generator circuit 126 effectuates a pulse-skipping mode of operation with respect to the clock signals clk1-clk4 and the charge pump operation (see, generally, FIG. 5).

The ramp voltage Vramp signal is output by a ramp signal generator circuit 148. In an embodiment, the ramp signal generator circuit 148 comprises a digital-to-analog converter (DAC) that receives a multi-bit digital signal D defining a decreasing voltage ramp and converts that digital signal to an analog ramp referenced to a reference voltage Vref (for example, generated using band-gap circuits as known in the art). Thus, the ramp signal starts at the reference voltage Vref and progressively decreases over time until the ground voltage is reached. The ramp signal is enabled when the charge pump is enabled.

Figure 4:
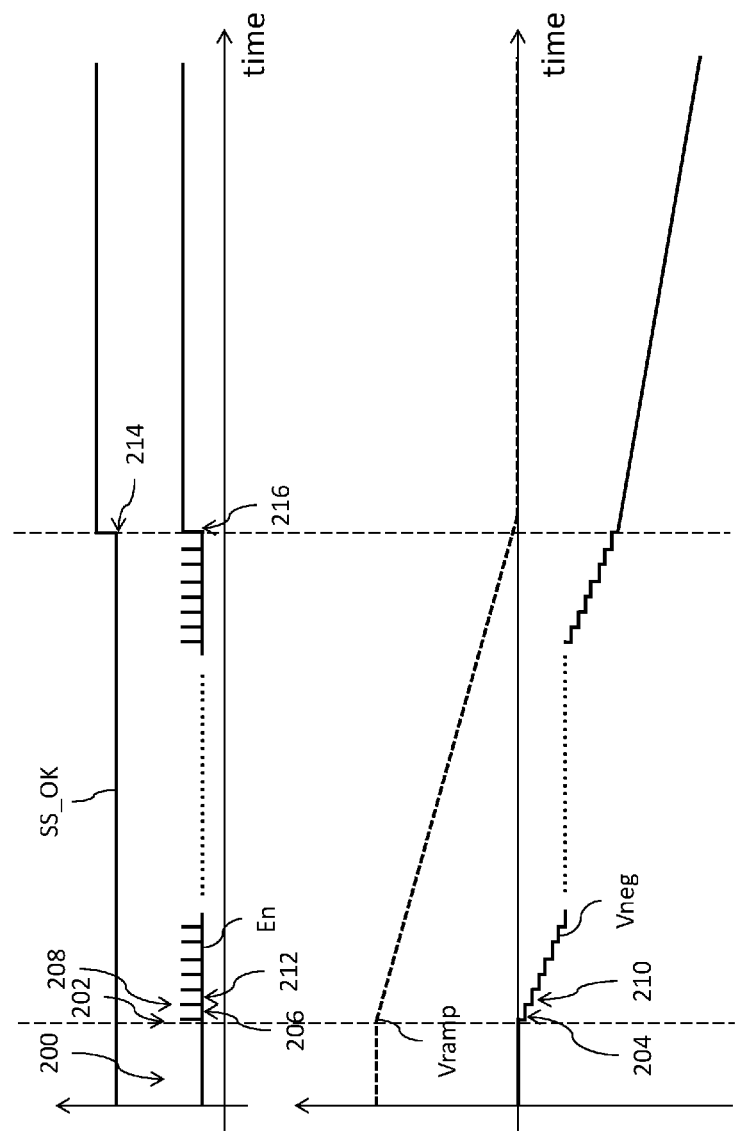
FIG. 4 illustrates the waveforms for soft-start operation of the circuit of FIG. 3.

Reference is now additionally made to FIG. 4 which generally illustrates the timing of the soft-start operation for the circuit 100 of FIG. 3.

The soft-start operation proceeds as follows: as the supply voltage Vdd begins to rise at start-up, both the control signal SS_OK and the enable signal En are not asserted. The non-overlap clock generator circuit 126 is accordingly disabled, and the AND gate 134 outputs a logic low signal which ensures that transistor 128 is turned off. Within a short delay time (reference 200), the supply voltage Vdd has already risen to a stable voltage level. The resistances for resistors R1, R2 and R3 are chosen so that the voltage at the first tap node 142 equals Vref when Vneg is zero. So, when Vramp begins to fall due to operation of the circuit, the comparator 160 changes state and the enable signal En is asserted (reference 202). The non-overlap clock generator circuit 126 responds to the asserted enable signal En by generating one or more cycles 42 of the clock signals clk1-clk4 (as shown at reference 46 in FIG. 5). The comparator 150 does not change state because the voltage level at the second tap node 144 remains below the voltage of the ramp signal. So, the clock signal clk2 is blocked by AND gate 134 and applied only to the transistor 128 in the first CMOS switching circuit 112. The transistor 116 of the first CMOS switching circuit 112 and the transistors 116 and 118 of the second CMOS switching circuit 114 receive the clock signals clk1, clk3 and clk4, respectively. The applied clock signals cause the charge pump to operate and pump the voltage at the negative voltage output node Vneg lower (reference 204). This pumping action shifts the voltages at the first and second tap nodes 142 and 144 lower and when the voltage at the first tap node is falls below voltage of the ramp signal, the comparator 160 changes state and disables the non-overlap clock generator circuit 126 (reference 206). For a period of time, the clock signals clk1-clk4 are not supplied effectuating a form of pulse skipping as shown at reference 48 in FIG. 5.

Eventually, the voltage at the first tap node 142 will exceed the voltage of the ramp signal. The comparator 160 again changes state and the enable signal En is asserted (reference 208). The non-overlap clock generator circuit 126 responds to the asserted enable signal En by again generating one or more cycles 42 of the clock signals clk1-clk4 (as shown at reference 50 in FIG. 5). The comparator 150 does not change state because the voltage level at the second tap node 144 remains below the voltage of the ramp signal. So, the clock signal clk2 is blocked by AND gate 134 and applied only to the transistor 128 in the first CMOS switching circuit 112. The transistor 116 of the first CMOS switching circuit 112 and the transistors 116 and 118 of the second CMOS switching circuit 114 receive the clock signals clk1, clk3 and clk4, respectively. The applied clock signals cause the charge pump to operate and further pump the voltage at the negative voltage output node Vneg lower (reference 210). This pumping action again shifts the voltages at the first and second tap nodes 142 and 144 lower and when the voltage at the first tap node is pumped lower than the voltage of the ramp signal, the comparator 160 changes state and disables the non-overlap clock generator circuit 126 (reference 212). For a period of time, the clock signals clk1-clk4 are not supplied effectuating a form of pulse skipping.

The foregoing processes (202/204/206 and 208/210/212) are cyclically repeated. Each cycle is instigated when the voltage at the first tap node 142 exceeds the falling voltage of the ramp signal. The non-overlap clock generator circuit 126 is enabled for a short time duration 46, 50 to perform charge pumping so as to pump the voltage at the negative voltage output node Vneg lower. When the lowered voltage causes the voltage at the first tap node 142 to fall below the voltage of the ramp signal, the non-overlap clock generator circuit 126 is disabled to implement pulse skipping 48. The falling of the ramp voltage causes the voltage at the first tap node 142 to shift and the cycle ends when the voltage at the first tap node 142 equals the falling voltage of the ramp signal.

Eventually, as a result of the cyclic pumping of the Vneg voltage lower, the stabilized supply voltage Vdd and the falling of the voltage of the ramp signal Vramp, the voltage at the second tap node 144 will exceed the voltage of the ramp signal Vramp and the comparator 150 will assert the control signal SS_OK (reference 214). This indicates the end of the soft-start period. The voltage at the first tap node 142 will also exceed the voltage of the ramp signal Vramp and the comparator 160 will assert the enable signal En (reference 216). At this point, the AND gate 134 passes the clock signal clk2 to the transistor 118 of the first CMOS switching circuit 112. Conventional operation of the charge pump then occurs to complete pumping of the Vneg voltage to a negative voltage whose absolute magnitude substantially equals the voltage Vpos.

The foregoing description has been provided by way of exemplary and non-limiting examples of a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A circuit, comprising:
   a charge pump circuit coupled between a positive supply node and a ground node, said charge pump circuit operating in response to a plurality of clock signals output from a clock generator to produce a negative voltage at a negative voltage output node, said charge pump circuit comprising:

a first transistor having a source-drain path coupled between the positive supply node and an intermediate node and controlled by a first signal of said plurality of clock signals;

a second transistor having a source-drain path coupled between the intermediate node and the ground node; and a third transistor having a source-drain path coupled between the intermediate node and the ground node and controlled by a second signal of said plurality of clock signals; and a soft-start circuit for said charge pump circuit comprising:

a comparison circuit configured to compare an intermediate voltage between a supply voltage and the negative voltage to a falling ramp voltage during a start-up of the charge pump circuit and selectively apply said second signal of said plurality of clock signals in response to said comparison to control said second transistor.

2. The circuit of claim 1, wherein said comparison circuit comprises a comparator having a first input coupled to receive the intermediate voltage and a second input coupled to receive the falling ramp voltage, said comparator further having an output generating a soft-start complete signal, wherein the second signal of said plurality of clock signals is applied to control the second transistor in response to said soft-start complete enable signal.

3. The circuit of claim 1, wherein said soft-start circuit further comprises a resistive divider circuit coupled between a supply node for the rising supply voltage and the negative voltage output node, said resistive divider circuit having a tap node generating the intermediate voltage.

4. A circuit, comprising:

a charge pump circuit coupled between a positive supply node and a ground node, said charge pump circuit operating in response to a plurality of clock signals output from a clock generator to produce a negative voltage at a negative voltage output node;

a soft-start circuit for said charge pump circuit comprising:

a comparison circuit configured to compare an intermediate voltage between a supply voltage and the negative voltage to a falling ramp voltage during a start-up of the charge pump circuit and selectively enable the clock generator to generate said plurality of clock signals in response to said comparison;

a resistive divider circuit coupled between a supply node for the rising supply voltage and the negative voltage output node, said resistive divider circuit having a first tap node generating the intermediate voltage and a second tap node generating an additional intermediate voltage less than said intermediate voltage; and an additional comparison circuit configured to compare the additional intermediate voltage to the falling ramp voltage during the start-up of the charge pump circuit and selectively enable a drive transistor within the charge pump circuit in response to said additional comparison.

5. The circuit of claim 4, wherein said charge pump circuit further comprises an additional transistor coupled in parallel with said drive transistor, said additional transistor driven by one of said plurality of clock signals and said drive transistor driven by the one of said plurality of clock signals only when selectively enabled by the additional comparison circuit.

6. The circuit of claim 5, wherein said additional transistor is smaller than said drive transistor.

7. A circuit, comprising:

a charge pump circuit coupled between a positive supply node and a ground node, said charge pump circuit including a clock generator configured to generate a plurality of clock signals, the charge pump circuit responding to said plurality of clock signals to produce a negative voltage at a negative voltage output node; and a soft-start circuit for said charge pump circuit operating to cause pulse skipping of the plurality of clock signals during soft-start, said pulse skipping occurring each time an intermediate voltage that is sensed by the soft-start circuit between a supply voltage and the negative voltage crosses over a ramp voltage;

wherein said charge pump circuit comprises:

a first drive transistor having a first control terminal configured to receive one of the plurality of clock signals;

a second drive transistor connected in parallel with the first drive transistor and having a second control terminal;

wherein said soft-start circuit comprises a logic gate configured to block application of said one of the plurality of clock signals to the second control terminal for a duration of a soft-start period and then pass said one of the plurality of clock signals to the second control terminal after the soft-start period ends.

8. The circuit of claim 7, wherein the soft-start circuit comprises a comparison circuit configured to compare said intermediate voltage to the ramp voltage and generate an enable signal, said clock generator operating in response to said enable signal.

9. The circuit of claim 7, wherein said soft-start circuit further comprises a resistive divider circuit coupled between a supply node for the supply voltage and the negative voltage output node, said resistive divider circuit having a tap node generating the intermediate voltage.

10. The circuit of claim 7, wherein said soft-start circuit further comprises:

a resistive divider circuit coupled between a supply node for the supply voltage and the negative voltage output node, said resistive divider circuit having a first tap node generating a threshold voltage; and a comparator circuit configured to compare the ramp voltage to the threshold voltage to generate an end of soft-start period signal for application to said logic gate.

11. The circuit of claim 10, wherein said resistive divider circuit further has a second tap node generating said intermediate voltage.

12. The circuit of claim 7, wherein said first drive transistor is smaller than said second drive transistor.

13. A circuit, comprising:

a charge pump circuit having a negative voltage output node and including:

a first CMOS switching circuit coupled between a positive supply node and a ground node and configured to receive first and second clock signals and having a first output;

a second CMOS switching circuit coupled between the ground node and the negative voltage output node and configured to receive third and fourth clock signals and having a second output;

wherein the first and second outputs are configured for connecting to opposite plates of a fly capacitor; and a clock generator circuit configured to generate the first through fourth clock signals; and a soft-start circuit for said charge pump circuit, the soft-start circuit comprising:

a resistive voltage divider having at least a first tap node and a second tap node, the resistive voltage divider coupled between a supply voltage node and the negative voltage output node;

a ramp signal generator configured to generate a ramp signal;

a first comparator configured to compare a voltage at the first tap node to a voltage of the ramp signal to generate a first enable signal applied to control enabling of the clock generator circuit to generate the first through fourth clock signals; and a second comparator configured to compare a voltage at the second tap node to the voltage of the ramp signal to generate a second enable signal applied to control enabling of a transistor within the first CMOS switching circuit.

14. The circuit of claim 13, wherein the first CMOS switching circuit comprises:

a p-channel MOSFET; and an n-channel MOSFET;

wherein the p-channel and n-channel MOSFETs are connected in series; and wherein the second enable signal is configured to enable operation of the n-channel MOSFET.

15. The circuit of claim 14, wherein the soft-start circuit further comprises:

an additional MOSFET coupled in parallel with the n-channel MOSFET, said additional MOSFET having a control terminal configured to receive one of the first through fourth clock signals; and wherein the n-channel MOSFET has a control terminal that is selectively enabled by the second enable signal to receive said one of the first through fourth clock signals.

16. The circuit of claim 15, wherein the soft-start circuit further comprises a logic gate having a first input configured to receive said one of the first through fourth clock signals, a second input configured to receive the second enable signal, and an output coupled to the control terminal of the n-channel MOSFET.

17. The circuit of claim 16, wherein the logic gate is an AND gate.

18. The circuit of claim 15, wherein said additional MOSFET is smaller than said n-channel MOSFET.

19. A circuit, comprising:

a charge pump circuit coupled between a positive supply node and a ground node, said charge pump circuit including a clock generator configured to generate a plurality of clock signals, the charge pump circuit responding to said plurality of clock signals to produce a negative voltage at a negative voltage output node;

wherein said charge pump circuit comprises:

a first drive transistor having a first control terminal configured to receive one of the plurality of clock signals;

a second drive transistor connected in parallel with the first drive transistor and having a second control terminal; and a soft-start circuit for said charge pump circuit comprising a logic gate configured to block application of said one of the plurality of clock signals to the second control terminal for a duration of a soft-start period and then pass said one of the plurality of clock signals to the second control terminal after the soft-start period ends;

said soft-start circuit further comprising:

a resistive divider circuit coupled between a supply node for the supply voltage and the negative voltage output node, said resistive divider circuit having a tap node generating a threshold voltage; and a comparator circuit configured to compare a ramp voltage to the threshold voltage to generate an end of soft-start period signal for application to said logic gate.

20. The circuit of claim 19, wherein said first drive transistor is smaller than said second drive transistor.

* * * * *